United States Patent
Kurdi et al.

(10) Patent No.: US 12,210,361 B1
(45) Date of Patent: Jan. 28, 2025

(54) METHOD OF MANAGING UNMANNED AERIAL VEHICLE PATROLS

(71) Applicant: KING SAUD UNIVERSITY, Riyadh (SA)

(72) Inventors: Heba Abdullatif Kurdi, Riyadh (SA); Ebtesam Mohammed Aloboud, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/670,907

(22) Filed: May 22, 2024

(51) Int. Cl.
| | |
|---|---|
| *G05D 1/693* | (2024.01) |
| *G05D 1/246* | (2024.01) |
| *G05D 1/698* | (2024.01) |
| *G05D 105/85* | (2024.01) |
| *G05D 109/20* | (2024.01) |
| *G06F 18/23213* | (2023.01) |

(52) U.S. Cl.
CPC ........... *G05D 1/693* (2024.01); *G05D 1/2464* (2024.01); *G05D 1/6985* (2024.01); *G06F 18/23213* (2023.01); *G05D 2105/85* (2024.01); *G05D 2109/20* (2024.01)

(58) Field of Classification Search
CPC .... G05D 1/693; G05D 1/2464; G05D 1/6985; G05D 2105/85; G05D 2109/20; G05D 1/00–1/87; G06F 18/23213
USPC ......................................................... 701/301
See application file for complete search history.

(56) References Cited

U.S. PATENT DOCUMENTS

| | | | | |
|---|---|---|---|---|
| 9,334,052 | B2 * | 5/2016 | Pasko ................. | G05D 1/0005 |
| 9,599,994 | B1 * | 3/2017 | Bogdanowicz ...... | G08G 5/0082 |
| 10,200,814 | B1 * | 2/2019 | Zhang ............... | G06F 16/90348 |
| 12,125,392 | B1 * | 10/2024 | Colpitts .......... | G06Q 10/08355 |

(Continued)

FOREIGN PATENT DOCUMENTS

| | | |
|---|---|---|
| CN | 106705970 B | 7/2020 |
| CN | 111580563 A | 8/2020 |

(Continued)

OTHER PUBLICATIONS

Bertuccelli et al. "Robust UAV search for environments with imprecise probability maps." Proceedings of the 44th IEEE Conference on Decision and Control. IEEE, 2005.

(Continued)

*Primary Examiner* — Mohamed Abdo Algehaim
(74) *Attorney, Agent, or Firm* — Nath, Goldberg & Meyer; Joshua B. Goldberg

(57) ABSTRACT

The method of managing unmanned aerial vehicle (UAV) patrols is a method for organizing and managing a fleet of UAVs for patrolling a geographic region for the detection of threats. During patrols, the UAVs visit two types of waypoints: critical waypoints and strategic waypoints. To establish the strategic waypoints, a set of seed points are generated using a beta probability distribution. Voronoi tessellation is applied to produce the set of strategic waypoints within the region of interest by using the set of seed points as an input. Each of the strategic waypoints has a set of coordinates on the three-dimensional occupancy map associated therewith. The set of coordinates associated with each of the strategic waypoints is a centroid of a corresponding Voronoi cell produced by the Voronoi tessellation. A priority score is assigned to each of the critical waypoints and each of the strategic waypoints.

10 Claims, 5 Drawing Sheets

(56) References Cited

U.S. PATENT DOCUMENTS

| | | | |
|---|---|---|---|
| 2006/0235610 A1* | 10/2006 | Ariyur | G05D 1/0217 |
| | | | 701/533 |
| 2008/0243372 A1* | 10/2008 | Bodin | G05D 1/0027 |
| | | | 701/23 |
| 2012/0210853 A1* | 8/2012 | Abershitz | B64F 1/04 |
| | | | 89/1.11 |
| 2017/0131727 A1* | 5/2017 | Kurdi | G05D 1/0027 |
| 2018/0012370 A1* | 1/2018 | Aghamohammadi | |
| | | | G06F 18/251 |
| 2018/0074520 A1* | 3/2018 | Liu | G08G 5/0013 |
| 2019/0035285 A1* | 1/2019 | Priest | G08G 5/045 |
| 2019/0227540 A1* | 7/2019 | Suvitie | G05D 1/104 |
| 2019/0353794 A1* | 11/2019 | Hiroi | F41G 7/00 |
| 2020/0041653 A1* | 2/2020 | Hiroi | G01S 19/015 |
| 2020/0064869 A1* | 2/2020 | Pickett | G05D 1/104 |
| 2021/0304625 A1* | 9/2021 | Ali | G01C 21/20 |
| 2021/0358315 A1* | 11/2021 | Moster | G08G 5/0069 |
| 2021/0405660 A1* | 12/2021 | Liu | G05D 1/104 |
| 2022/0005361 A1* | 1/2022 | de la Cruz | G08G 5/0034 |
| 2022/0318720 A1* | 10/2022 | Li | G06Q 10/06316 |
| 2022/0365534 A1* | 11/2022 | Kuhlman | G05D 1/104 |
| 2023/0315128 A1* | 10/2023 | Bradley | G05D 1/12 |
| | | | 701/2 |
| 2024/0077871 A1* | 3/2024 | Choi | G06F 3/04815 |
| 2024/0361775 A1* | 10/2024 | Lee | G05D 1/2297 |

FOREIGN PATENT DOCUMENTS

| | | |
|---|---|---|
| CN | 110488871 B | 2/2022 |
| CN | 112327923 B | 4/2022 |
| CN | 112666981 B | 11/2022 |
| CN | 115930962 A | 4/2023 |
| CN | 110926477 B | 7/2023 |
| CN | 117369510 A | 1/2024 |
| CN | 117369515 A | 1/2024 |

OTHER PUBLICATIONS

Bertuccelli et al. "Search for dynamic targets with uncertain probability maps." 2006 American Control Conference. IEEE, 2006.

Lim et al. "Waypoint guidance of cooperative UAVs for intelligence, surveillance, and reconnaissance." 2009 IEEE International Conference on Control and Automation. IEEE, 2009.

Zhu et al. "Decentralized probabilistic multi-robot collision avoidance using buffered uncertainty-aware Voronoi cells." Autonomous Robots 46.2 (2022): 401-420.

* cited by examiner

METHOD OF MANAGING UNMANNED AERIAL VEHICLE PATROLS

BACKGROUND

Field

The disclosure of the present patent application relates to aerial monitoring and surveillance, and particularly to a method of managing aerial patrols of a region of interest carried out by unmanned aerial vehicles (UAVs).

Description of Related Art

Traditional methods for monitoring and countering adversarial unmanned aerial vehicles (UAVs), such as closed-circuit television (CCTV) cameras and radar, have limitations due to their stationary nature and narrow scope, thus resulting in limited scalability. In response, the development of systems utilizing remotely controlled UAVs for enhanced patrolling missions is of great interest, particularly due to patrolling UAVs offering greater flexibility and scalability. However, present UAV patrol system face challenges, including the need for continuous communication with a base station, which restricts operational flexibility. Additionally, the predictability of their patrolling patterns can be easily circumvented by unauthorized drones, thus highlighting the necessity for advancements in UAV autonomy to improve decision-making and operations, particularly in scenarios where real-time human intervention is not feasible. Thus, a method of managing unmanned aerial vehicle patrols solving the aforementioned problems is desired.

SUMMARY

The method of managing unmanned aerial vehicle (UAV) patrols is a method for organizing and managing a fleet of UAVs for patrolling a geographic region for the detection of threats. The fleet of UAVs forms a network in communication with a base station. Within the base station, a geographic map is converted into a three-dimensional occupancy map, and a region of interest therein is identified. The three-dimensional occupancy map may be divided into a grid of cells to define a coordinate system corresponding to geographic locations. The three-dimensional occupancy map assists in identifying occupied and unoccupied spaces. During patrols, the UAVs visit two types of waypoints: critical waypoints and strategic waypoints. The set of critical waypoints are established within the region of interest and each of the critical waypoints has a set of coordinates on the three-dimensional occupancy map associated therewith. An operator within the base station may use the three-dimensional occupancy map to identify the critical waypoints in the region of interest, where the critical waypoints may be, as an example, landmarks or locations of known strategic value. Alternatively, the critical waypoints can be generated automatically by the base station during an initialization phase.

To establish the strategic waypoints, a set of seed points are generated using a beta probability distribution. Voronoi tessellation is applied to produce the set of strategic waypoints within the region of interest by using the set of seed points as an input. Each of the strategic waypoints has a set of coordinates on the three-dimensional occupancy map associated therewith. The set of coordinates associated with each of the strategic waypoints is a centroid of a corresponding Voronoi cell produced by the Voronoi tessellation. The beta probability distribution, $f(x; \alpha, \beta)$, used to generate the set of seed points is given by $$f(x; \alpha, \beta) = \left(\frac{1}{B(\alpha, \beta)}\right)x^{\alpha-1}(1-x)^{\beta-1},$$

where $B(\alpha, \beta)$ is the beta function, x is a random variable ranging between 0 and 1, and $\alpha$ and $\beta$ are shape parameters. For each of the seed points, the beta probability distribution, $f(x; \alpha, \beta)$, is applied twice to produce a set of abstract coordinates $(x_\beta, y_\beta)$, where each of $x_\beta$ and $y_\beta$ ranges between 0 and 1. The set of abstract coordinates $(x_\beta, y_\beta)$ for each of the seed points is scaled to a set of geographic coordinates $(x_{geo}, y_{geo})$ on the three-dimensional occupancy map as $x_{geo}=x_\beta \times W$ and $y_{geo}=y_\beta \times L$, where W is the width of the three-dimensional occupancy map and L is the length of the three-dimensional occupancy map.

A priority score is assigned to each of the critical waypoints and each of the strategic waypoints. The priority score, P, for each of the critical waypoints and each of the strategic waypoints is given by $P=B+(T \times A)$, where B is a base score, T is a total number of threats previously encountered at the corresponding one of the critical and strategic waypoints, and A is a threat adjustment value, where each of the critical waypoints has a base score, B, of s, where s is a generic base score, and each of the strategic waypoints has a base score, B, of $s \times u$, where $0<u<1$. The threat adjustment value, A, has a value of 10 for each of the threats previously encountered at the corresponding one of the critical and strategic waypoints.

A plurality of UAVs is divided into a set of leader UAVs and a set of follower UAVs. The critical and strategic waypoints are clustered by applying k-mean clustering based on the total number of leader UAVs. A risk factor is assigned to each of the clusters, and the UAVs are assigned to the clusters based on the respective risk factors of the clusters. The risk factor, R, for each of the clusters is given by $$R = \frac{S}{U+1},$$

where S is a sum of the priority scores of the critical and strategic waypoints within the respective cluster, and U is a total number of the UAVs assigned to the respective cluster.

Each of the UAVs visits the critical and strategic waypoints within the cluster assigned thereto. The choice of a particular one of the critical and strategic waypoints to be visited is based on a weighted score. The weighted score, $S_w$, is given by $S_w=(W_I \times I)+(W_D \times D)+(W_P \times P)$, where I is an idleness time, D is a distance between a corresponding one of the UAVs and the corresponding one of the critical and strategic waypoints, and P is the priority score of the corresponding one of the critical and strategic waypoints. $W_I$ is a weight for the idleness, $W_D$ is a weight for the distance, and $W_P$ is a weight for the priority score.

Additionally, the follower UAVs may each have the capability of generating decoy waypoints at regular intervals. The decoy waypoints have randomly selected coordinates within the corresponding cluster of the corresponding one of the follower UAVs. Further, when a threat is detected, leader and follower UAVs may have the capability to transition into a chaser UAV. Upon detection of a potential threat, the chaser UAV continuously monitors the potential threat.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
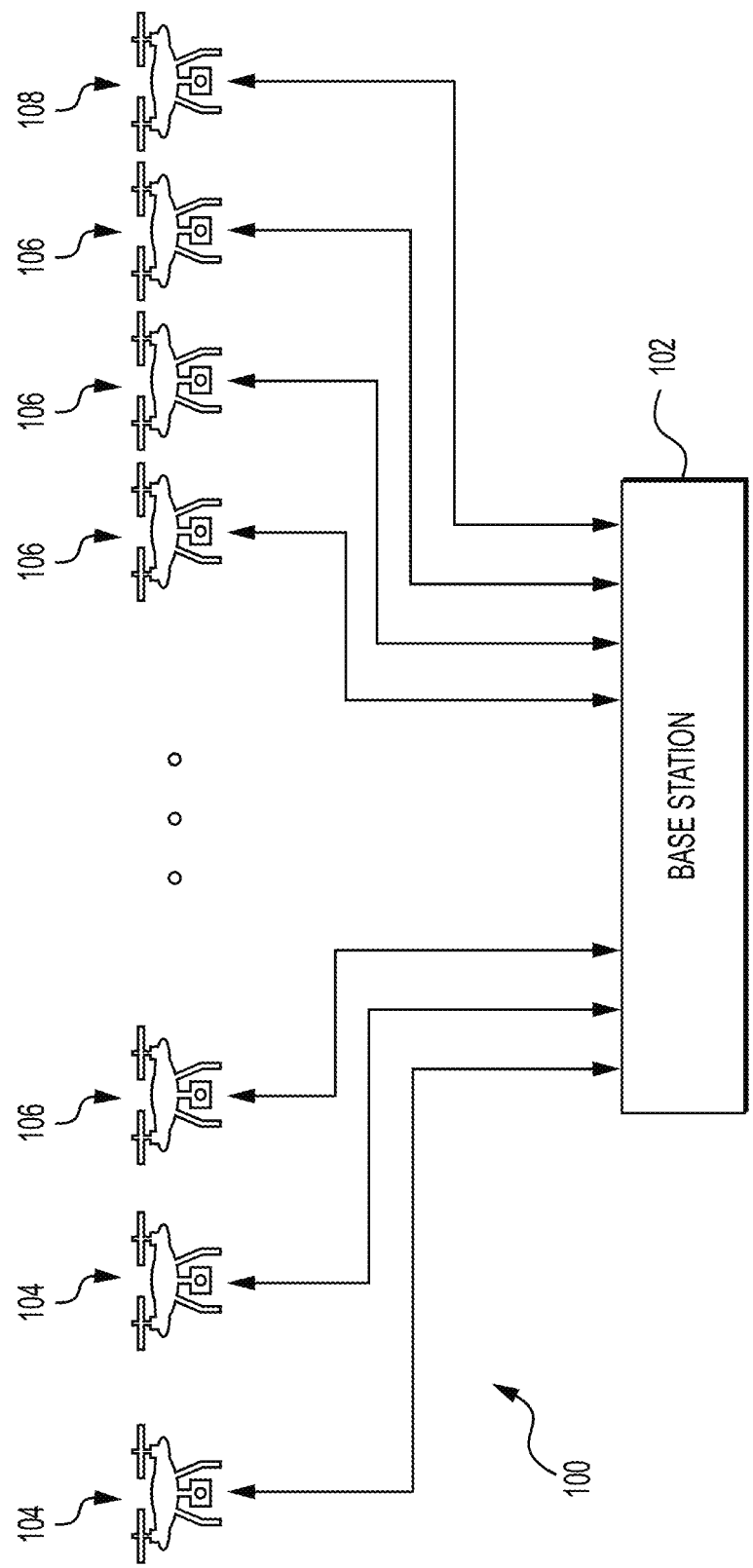
FIG. 1 diagrammatically illustrates a fleet of unmanned aerial vehicles (UAVs) in communication with a base station as part of the method of managing unmanned aerial vehicle patrols.

The method of managing unmanned aerial vehicle (UAV) patrols is a method for organizing and managing a fleet of UAVs for patrolling a geographic region for the detection of threats. As illustrated in FIG. 1, the fleet of UAVs forms a network 100 in communication with a base station 102. The base station 102 may be equipped with advanced mission planning and geospatial analysis tools. Within the base station 102, a geographic map is converted into a three-dimensional occupancy map, and a region of interest therein is identified. The three-dimensional occupancy map may be divided into a grid of cells to define a coordinate system corresponding to geographic locations. The three-dimensional occupancy map assists in identifying occupied and unoccupied spaces.

As will be discussed in detail below, the UAVs are divided into groups, including leader UAVs 104 and follower UAVs 106. Either type of UAV (leader or follower) may transition into a chaser UAV 108, as will be discussed in detail below. Although only two leader UAVs 104, four follower UAVs 106 and one chaser UAV 108 are shown in FIG. 1, it should be understood that these relatively small numbers of UAVs are shown for purposes of clarity and illustration only, and that it is contemplated that more or fewer UAVs may be deployed. Further, it should be understood that UAVs 104, 106, 108 may be any suitable type of UAVs, drones or the like.

Figure 2:
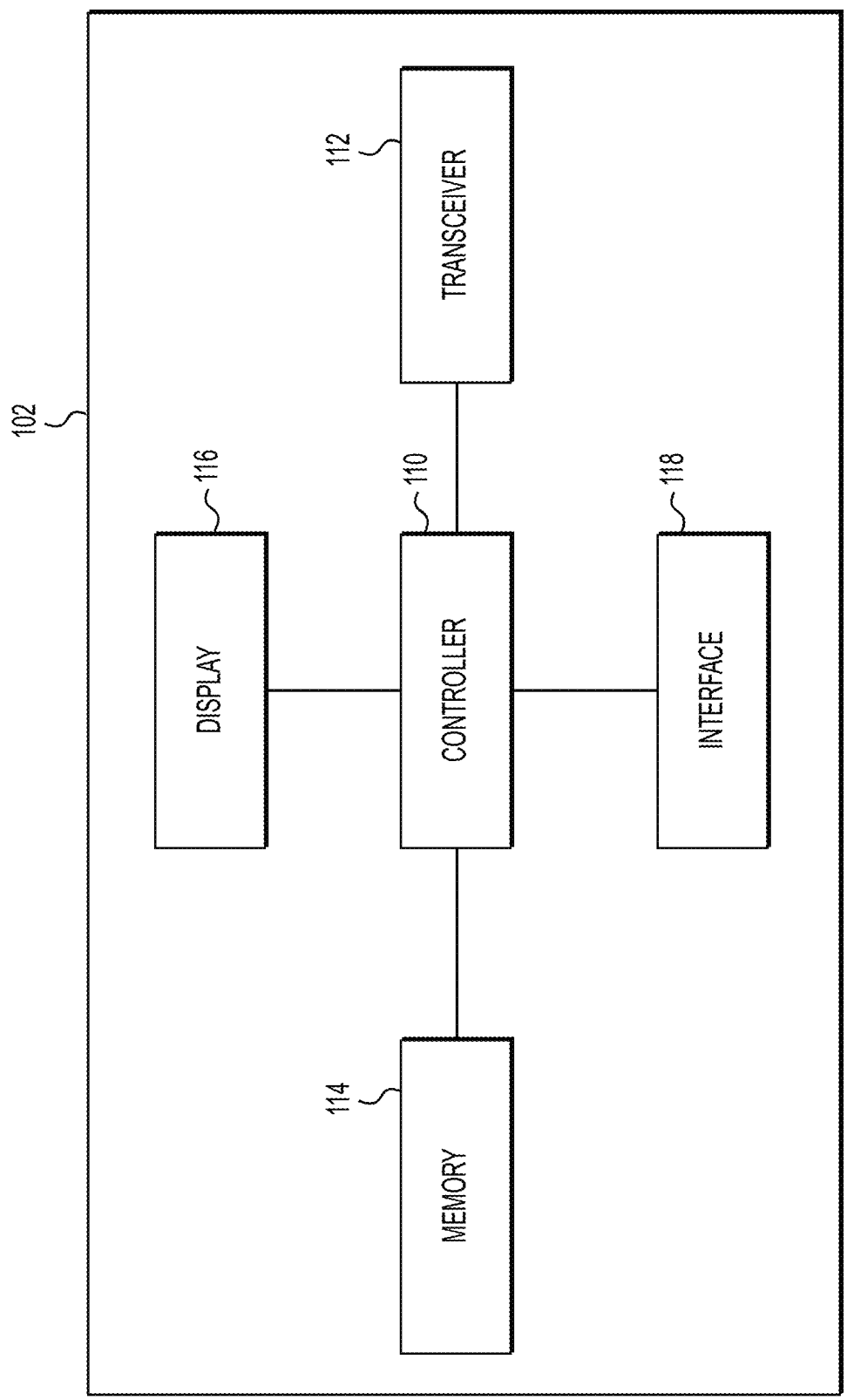
FIG. 2 is a block diagram illustrating control components of the base station.

The base station 102 may be, for example, a ground-based control center or command post. The base station 102 is responsible for planning the mission, assigning initial roles to individual UAVs and facilitating the exchange of data, commands and feedback between the UAVs 104, 106, 108 and the control team as needed. The base station 102 has software and geospatial analysis tools for mission planning and data analysis. As shown in FIG. 2, base station 102 includes at least a controller 110 in communication with a transceiver 112 for transmitting and receiving wireless signals to and from UAVs 104, 106, 108. The controller 110 is also in communication with memory 114, an interface 118 and a display 116. It should be understood that controller 110 may be any suitable type of controller, such as a computer, a processor, a programmable logic controller or the like. It should be further understood that memory 114 may be any suitable type of computer readable storage memory. It should be understood that transceiver 112 may be any suitable type of wireless transceiver for communicating with UAVs 104, 106, 108 using any suitable wireless protocol.

Figure 3:
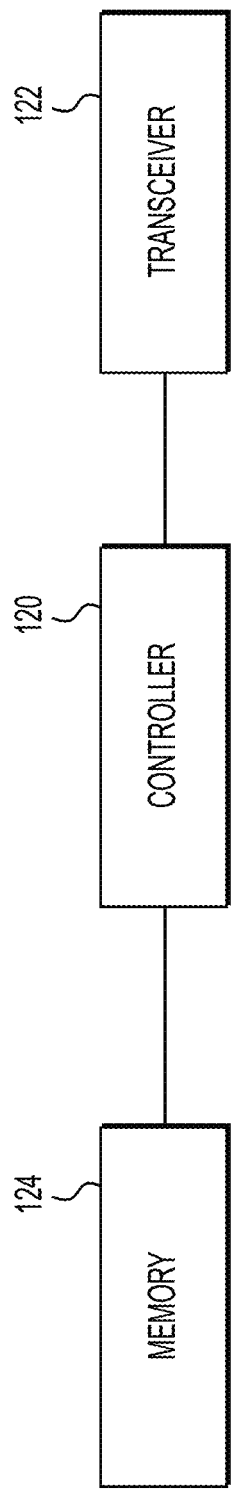
FIG. 3 is a block diagram illustrating control components of a UAV.

As shown in FIG. 3, each of UAVs 104, 106, 108 has a controller 120 for navigation, path planning and operational control. Controller 120 is in communication with a transceiver 122 and memory 124, each also carried on the UAV. It should be understood that controller 120 may be any suitable type of controller, such as a computer, a processor, a programmable logic controller or the like. It should be further understood that memory 124 may be any suitable type of computer readable storage memory. It should be understood that transceiver 122 may be any suitable type of wireless transceiver for communicating with base station 102 using any suitable wireless protocol.

Figure 4:
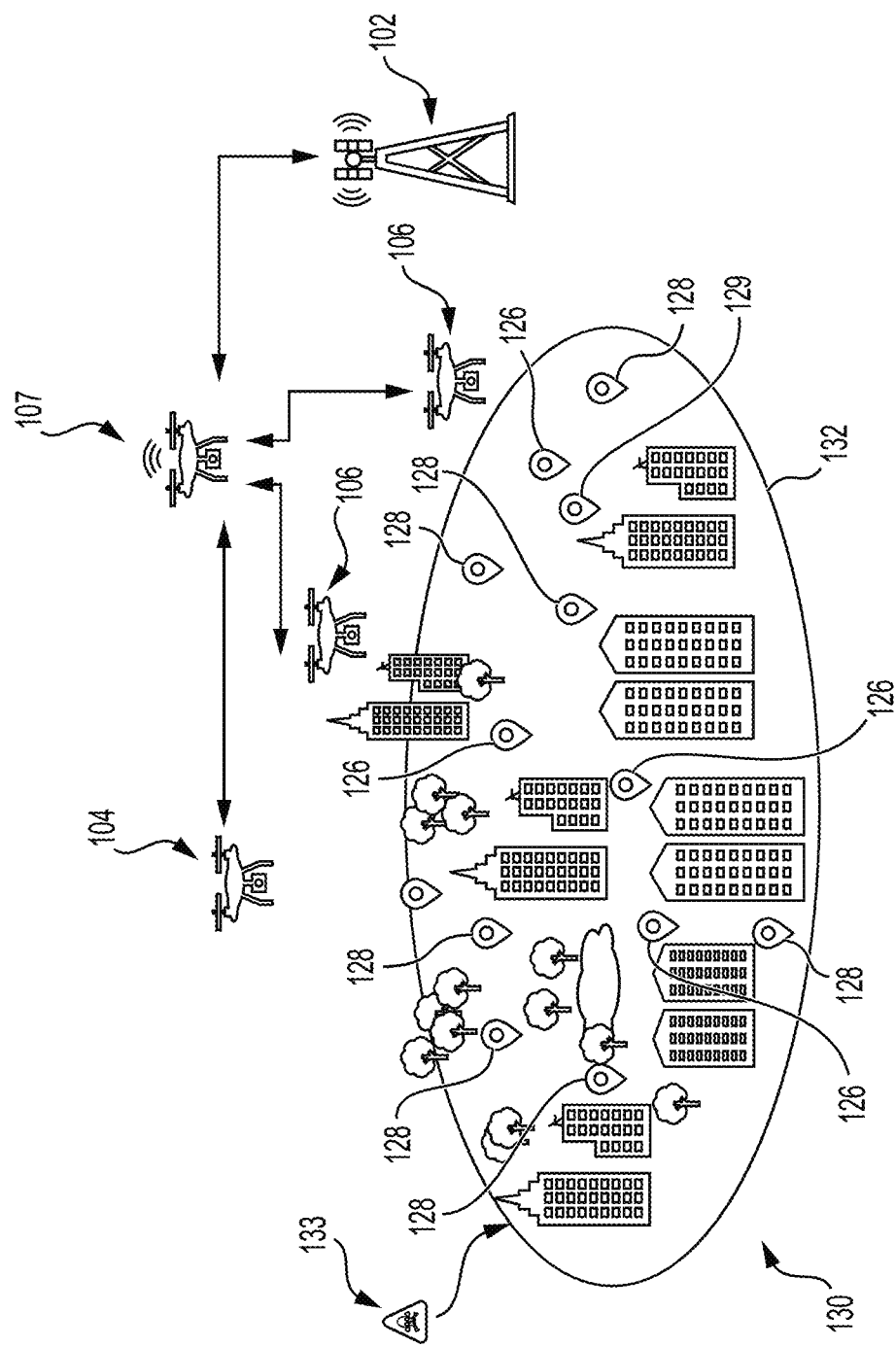
FIG. 4 diagrammatically illustrates the method of managing unmanned aerial vehicle patrols in a simplified geographic environment.

As illustrated in FIG. 4, during patrols, the UAVs 104, 106, 108 visit two types of waypoints: critical waypoints 126 and strategic waypoints 128. The set of critical waypoints 126 is established within the region of interest 130 and each of the critical waypoints 126 has a set of coordinates on the three-dimensional occupancy map associated therewith. An operator within the base station 102 may use the three-dimensional occupancy map (which is stored in memory 114) to identify the critical waypoints 126 in the region of interest 130, where the critical waypoints 126 may be, as an example, landmarks or locations of known strategic value. Alternatively, the critical waypoints 126 may be generated automatically by the controller 110 of base station 102 during an initialization phase.

Figure 5:
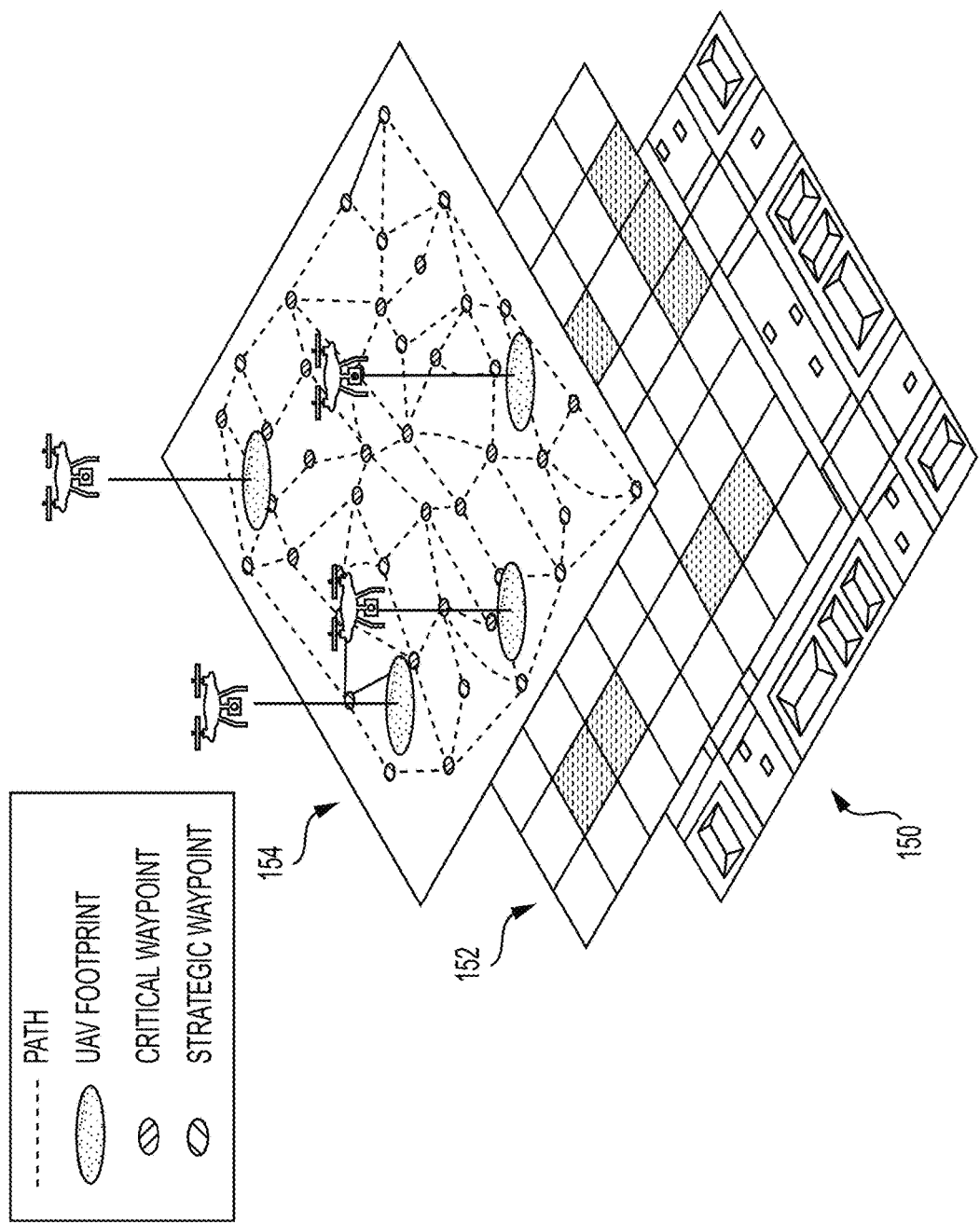
FIG. 5 illustrates a geographical map, a three-dimensional occupancy map and a topological map generated in the method of managing unmanned aerial vehicle patrols.

It should be understood that FIG. 4 is a simplified illustration of an actual geographic region of interest 130 defined by border 132. As illustrated in FIG. 5, a geographic map 150 of the actual terrain is converted into the three-dimensional occupancy map 152 by controller 110 of base station 102. Although geographic map 150 and three-dimensional occupancy map 152 are shown as two-dimensional in FIG. 5, it should be understood that this is solely for purposes of illustration and that the maps are three-dimensional with locations indicated by three-dimensional coordinates. The geographic environment is represented by the three-dimensional occupancy map 152, which is broken into cells, with each cell of map 152 being assigned a probability value. The probability values distinguish between spaces that are occupied (i.e., containing obstacles) and those that are unoccupied (i.e., free of obstacles). Within the three-dimensional occupancy map 152, the waypoints 126, 128 serve as landmarks for the UAVs 104, 106, 108 to visit repeatedly during patrols. The critical waypoints 126 are landmark locations within the designated patrol area. The critical waypoints 126 typically remain static throughout the mission, representing essential locations that require more frequent visiting than other waypoints due to their critical nature. The strategic waypoints 128 are landmarks within the designated patrol area, automatically generated by the base station 102 during the initialization phase. The strategic waypoints 128 are usually static throughout the entire mission. As will be discussed in greater detail below, a topological map 154 is further generated, which includes the flight paths of the UAVs along with geographical features and the waypoints 126, 128.

To establish the strategic waypoints 128, a set of seed points are generated using a beta probability distribution. Voronoi tessellation is applied to produce the set of strategic waypoints 128 within the region of interest 130 by using the set of seed points as an input. Each of the strategic waypoints 128 has a set of coordinates on the three-dimensional occupancy map 152. The set of coordinates associated with each of the strategic waypoints 128 is a centroid of a corresponding Voronoi cell produced by the Voronoi tessellation. The Voronoi tessellation optimizes the strategic waypoints 128 by minimizing their proximity to one another, thus reducing the overall density of waypoints 126, 128 while maintaining strategic coverage. By reducing instances of strategic waypoints 128 being excessively close to one another, redundancy in patrolling is minimized.

The beta probability distribution, $f(x; \alpha, \beta)$, used to generate the set of seed points is given by $$f(x; \alpha, \beta) = \left(\frac{1}{B(\alpha, \beta)}\right) x^{\alpha-1} (1-x)^{\beta-1},$$

where $B(\alpha, \beta)$ is the beta function, x is a random variable ranging between 0 and 1, and $\alpha$ and $\beta$ are shape parameters. For each of the seed points, the beta probability distribution, $f(x; \alpha, \beta)$, is applied twice to produce a set of abstract coordinates $(x_\beta, y_\beta)$, where each of $x_\beta$ and $y_\beta$ ranges between 0 and 1. The set of abstract coordinates $(x_\beta, y_\beta)$ for each of the seed points is scaled to a set of geographic coordinates $(x_{geo}, y_{geo})$ on the three-dimensional occupancy map 152 as $x_{geo} = x_\beta \times W$ and $y_{geo} = y_\beta \times L$, where W is the width of the three-dimensional occupancy map 152 and L is the length of the three-dimensional occupancy map 152. By setting the shape parameter $\alpha$ higher than the shape parameter $\beta$, the strategic waypoints 128 will be more concentrated on the border 132 of the region of interest 130, which is important since the border 132 is assumed to be an intruder's entry point into the region of interest 130. In FIG. 4, a general intruder or threat 133 is shown on border 132. An example of such an intruder or threat 133 is an enemy surveillance or attack drone entering region of interest 130.

A priority score is assigned to each of the critical waypoints 126 and each of the strategic waypoints 128. The priority score, P, for each of the critical waypoints 126 and each of the strategic waypoints 128 is given by $P=B+(T\times A)$, where B is a base score, T is a total number of threats previously encountered at the corresponding one of the critical and strategic waypoints 126, 128, and A is a threat adjustment value, where each of the critical waypoints 126 has a base score, B, of s, where s is a generic base score, and each of the strategic waypoints 128 has a base score, B, of s×u, where 0<u<1. The threat adjustment value, A, has a value of 10 for each of the threats previously encountered at the corresponding one of the critical and strategic waypoints 126, 128. As indicated above, the priority score, P, is calculated based on waypoint type and the number of encountered threats. Critical waypoints 126 have the highest score, indicating that they should be revisited more frequently. Strategic waypoints 128 have a "medium" priority score. This priority score is further adjusted based on the number of threats encountered at the waypoint.

As noted above, the fleet of UAVs is divided into a set of leader UAVs 104 and a set of follower UAVs 106. The leader UAVs 104 and the follower UAVs 106 form the network 100 in communication with the base station 102. The critical and strategic waypoints 126, 128 are clustered by applying k-mean clustering based on the total number of leader UAVs 104. The number of clusters is determined based on the number of UAVs such that each UAV is assigned a set of waypoints that can be efficiently covered within an allocated time frame. A risk factor is assigned to each of the clusters, and the UAVs are assigned to the clusters based on the respective risk factors of the clusters. The risk factor, R, for each of the clusters is given by $$R = \frac{S}{U+1},$$

where S is a sum of the priority scores of the critical and strategic waypoints 126, 128 within the respective cluster, and U is a total number of the UAVs assigned to the respective cluster.

The clusters have different states: "Assigned", "Reassigning" and "Unassigned". The state of the cluster is "Assigned" when it has a leader UAV 104; the state is "Reassigning" when there is at least one follower UAV 106 but no leader UAV 104; and, otherwise, the state is "Unassigned" when there is neither a follower UAV 106 nor a leader UAV 104. The risk factor is initialized to zero before the mission starts and adjusts dynamically based on the number of UAVs in each cluster and the total priority score of all waypoints 126, 128. This prioritization ensures focused surveillance where it is most needed. For each cluster, the topological map 154 is created using visibility graphs. The topological map 154 and visibility graphs help understand which waypoints are directly visible to each other, indicating a clear line of sight. In cases where there is no direct line of sight between two waypoints (i.e., they are not directly connected in the visibility graph), a path planning algorithm is used. This algorithm finds a feasible path between these waypoints, considering the occupancy map 152 to avoid obstacles.

Each of the UAVs visits the critical and strategic waypoints 126, 128 within the cluster assigned thereto. The choice of a particular one of the critical and strategic waypoints 126, 128 to be visited is based on a weighted score. The weighted score, $S_w$, is given by $S_w=(W_I\times I)+(W_D\times D)+(W_P\times P)$, where I is an idleness time, D is a distance between a corresponding one of the UAVs and the corresponding one of the critical and strategic waypoints, and P is the priority score of the corresponding one of the critical and strategic waypoints. $W_I$ is a weight for the idleness, $W_D$ is a weight for the distance, and $W_P$ is a weight for the priority score. The idleness time, I, is the time since the waypoint was last visited. A longer idleness time increases a waypoint's priority for visitation. The distance, D, represents the distance from the UAV's current position to the waypoint. Shorter distances are generally preferred to minimize travel time.

In addition to the above factors, each waypoint 126, 128 also has a current threat condition associated therewith. The current threat condition indicates whether a potential threat at a certain waypoint is "Active" or "Inactive". When the threat condition becomes "Active", the number of threats, T, is automatically increased by one. Further, each waypoint 126, 128 has a visiting status associated therewith. The visiting status of a waypoint follows a specific cycle: "Unvisited", "Visit", or "Visited". Initially, all waypoints are "Unvisited". When a waypoint is under monitoring, its status changes to "Visit". After the monitoring is complete, the waypoint's status is updated to "Visited". After a certain period, waypoints automatically revert to "Unvisited" with a higher priority score which elapses faster. Following cluster selection, each UAV independently navigates the waypoints 126, 128 within its cluster. During its navigation, the UAV checks whether there is an intruder. If an intruder is detected, the UAV informs the base station 102 and tracks the intruder until the base station 102 acknowledges that it is in full control of the situation.

Each leader UAV 104 selects its cluster based on the risk factor. Once the cluster status is "Assigned", the leader UAV 104 makes real-time decisions on the waypoint to be visited, considering factors such as idleness, distance and priority score. Each follower UAV 106 independently selects the waypoint to be visited, considering factors such as idleness, distance and priority score, similar to the leader UAV 104. Additionally, the follower UAVs 106 may each have the capability of generating decoy waypoints 129 at regular intervals. The decoy waypoints 129 have randomly selected coordinates within the corresponding cluster of the corresponding one of the follower UAVs 106. The decoy waypoints 129 are dynamically created and randomly positioned targets that emerge temporarily and vanish once visited. Their primary purpose is to mislead potential intruders, preventing them from recognizing the usual landmarks and routes the UAVs utilize. By intermittently introducing these unpredictable waypoints, the UAVs can effectively obscure their regular patrol patterns, making it more challenging for unauthorized entities to predict or learn their standard operating paths. This strategy enhances the overall security and unpredictability of UAV patrolling missions.

Further, when a threat is detected, leader and follower UAVs 104, 106 may have the capability to transition into a chaser UAV 108. Upon detection of a potential threat, the chaser UAV 108 continuously monitors the potential threat. The chaser role of the UAV is activated when a potential threat is identified. When a UAV transitions to a chaser UAV 108, it becomes focused on monitoring the detected intruder. The chaser UAV 108 continues to monitor the target until it receives specific instructions from the base station 102 or executes a predetermined action, such as forcing a landing, if no instructions are received within a specific timeframe.

A shared memory system is used to maintain dynamic replicas of the environment maps 150, 152, 154 stored in the memory 114 of base station 102 and to bolster fleet autonomy and improve decision-making processes. The shared memory system supports a decentralized command structure while offering hierarchical layered access and visibility to both the UAVs and the base station 102 according to their operational roles. To facilitate communication, at least two UAVs are designated as communication overlay UAVs 107, ensuring access to the shared memory. In FIG. 4, for purposes of simplification and clarity, only a single communication overlay UAV 107 is shown. The communication overlay UAVs 107 operate in tandem, with one acting as a memory storage backup to guarantee constant availability. Each communication overlay UAV 107 holds a dynamic copy of the virtual environment maps 150, 152, 154, regularly updated with the latest statuses of the UAVs, clusters and waypoints as the mission unfolds. Information distribution is structured across three levels: an intra-cluster layer, an inter-cluster layer, and a global layer.

In the intra-cluster layer, the follower UAVs 106 have access to information within their cluster, including the roles and positions of all UAVs, the overall cluster status ("Assigned", "Reassigning" and "Unassigned"), the waypoints' attributes, and the cluster risk factor. The leader UAVs 104 have access to the inter-cluster layer. In addition to the intra-cluster information, the inter-cluster layer facilitates the exchange of information between different clusters. The inter-cluster layer includes details on the status of other clusters based on the presence or absence of leader UAVs 104, the number of follower UAVs 106, and other clusters' risk factors. The global layer provides the threat management system and base station 102 with a comprehensive overview of the mission that covers UAV statuses, cluster conditions, UAV health, mission progression, and critical event notifications. The base station 102 intermittently receives updates that facilitate information flow and enable informed responses by operational teams.

Upon initialization, the base station 102 loads the critical and strategic waypoints, clusters and their initial states into the shared memory. The base station 102 assigns roles (i.e., leader or follower UAV) and clusters the UAVs based on the availability of the UAVs and the state of each cluster. If an unassigned cluster exists, the next available UAV is designated as a leader UAV and assigned to that cluster, marking the cluster as "Assigned". If all clusters are already assigned, the base station 102 assigns the UAV a follower role and directs it to the cluster, considering the cluster risk factor. The base station 102 then starts the patrolling phase.

As discussed above, during the patrolling phase, the UAVs patrol their assigned areas with autonomy, deciding in real-time which waypoints to visit. This decision-making process employs a heuristic algorithm to adapt to changing conditions and prioritize surveillance tasks. Additionally, at regular intervals, follower UAVs 106 add and visit decoy waypoints 129 to increase unpredictability. The decoy waypoints 129 disappear after being visited. Each UAV is responsible for making the decision of which waypoint to visit next, changing its status from "Unvisited" to "Visiting" and, subsequently, to "Visited". After a certain period, waypoints revert to "Unvisited" status that have a higher priority score elapsing faster.

As discussed above, the cluster risk factors, waypoint priority scores and the cluster states are automatically calculated in the shared memory. When a threat is encountered at a waypoint, both the risk factor for the cluster containing this waypoint and the priority score of the waypoint itself are updated. Moreover, the risk factor is recalculated if the number of UAVs in the cluster changes. The cluster state is updated if the status of leadership within the cluster shifts, specifically transitioning to "Assigned" when a leader UAV 104 is present, to "Reassigning" when at least one follower UAV 106 remains but no leader UAV 104 is present, and to "Unassigned" when there are neither follower nor leader UAVs are in the cluster.

The UAVs may switch roles in response to changes in operational requirements. When a leader UAV 104 identifies a threat, it transitions to a chaser UAV 108 to closely monitor the situation. This change automatically marks the original cluster as "Reassigning" if the cluster has follower UAVs 106, potentially triggering a follower UAV 106 to step up as the new leader UAV 104, or "Unassigned" if the cluster has no follower UAVs 106, triggering a request for support from other clusters in the shared memory to ensure uninterrupted surveillance. A leader UAV 104 may transition to a follower role if it currently has follower UAVs 106 in its cluster and another cluster is identified as having a higher risk factor.

If a follower UAV 106 detects that its cluster status is "Reassigning" in the shared memory, it elevates itself to a leader role. This self-promotion is crucial for maintaining continuous coverage and adapting to evolving surveillance needs. When a follower UAV 106 discovers a threat in its cluster, it changes to a chaser role and updates its new role in the shared memory. If a threat is "Inactive", a chaser UAV 108 checks if there is an "Unassigned" cluster. If an "Unassigned" cluster exists, the chaser UAV 108 becomes its leader UAV 104. If not, the chaser UAV 108 becomes a follower UAV 106 within a cluster with a higher risk factor. Additionally, a leader UAV 104 may transition to lead another cluster if the other cluster is "Unassigned" under specific conditions: a) if the current cluster has follower UAVs 106; or b) if the current cluster has no follower UAVs 106 but the other cluster has a higher risk factor.

It is to be understood that the method of managing unmanned aerial vehicle patrols is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of managing unmanned aerial vehicle patrols, comprising:
    establishing a three-dimensional occupancy map defining a region of interest;
    establishing a set of critical waypoints within the region of interest, wherein each of the critical waypoints has a set of coordinates on the three-dimensional occupancy map associated therewith;
    generating a set of seed points using a beta probability distribution;
    applying Voronoi tessellation to produce a set of strategic waypoints within the region of interest by using the set of seed points as an input, wherein each of the strategic waypoints has a set of coordinates on the three-dimensional occupancy map associated therewith, and wherein the set of coordinates associated with each of the strategic waypoints is a centroid of a corresponding Voronoi cell produced by the Voronoi tessellation;
    assigning a priority score, P, to each of the critical waypoints and each of the strategic waypoints, wherein the priority score, P, for each of the critical waypoints and each of the strategic waypoints is given by $P=B+(T \times A)$, where B is a base score, T is a total number of threats previously encountered at the corresponding one of the critical and strategic waypoints, and A is a threat adjustment value, wherein each of the critical waypoints has a base score, B, of s, where s is a generic base score, and each of the strategic waypoints has a base score, B, of $s \times u$, where $0 < u < 1$, and the threat adjustment value, A, has a value of 10 for each of the threats previously encountered at the corresponding one of the critical and strategic waypoints;
    dividing a plurality of unmanned aerial vehicles (UAVs) into a set of leader UAVs and a set of follower UAVs;
    clustering the critical and strategic waypoints by applying k-mean clustering based on a total number of leader UAVs into clusters;
    assigning a risk factor to each of the clusters;
    assigning the UAVs to the clusters based on the respective risk factors of the clusters; and
    each of the UAVs visiting the critical and strategic waypoints within the cluster assigned thereto, wherein a choice of a particular one of the critical and strategic waypoints to be visited is based on a weighted score.

2. The method of managing unmanned aerial vehicle patrols as recited in claim 1, wherein the beta probability distribution, $f(x; \alpha, \beta)$, is given by $f(x; \alpha, \beta) = \left(\frac{1}{B(\alpha, \beta)}\right) x^{\alpha-1}(1-x)^{\beta-1}$, where $B(\alpha, \beta)$ is a beta function, x is a random variable ranging between 0 and 1, and $\alpha$ and $\beta$ are shape parameters.

3. The method of managing unmanned aerial vehicle patrols as recited in claim 2, wherein, for each of the seed points, the beta probability distribution, $f(x; \alpha, \beta)$, is applied twice to produce a set of abstract coordinates $(x_\beta, y_\beta)$, wherein each of $x_\beta$ and $y_\beta$ ranges between 0 and 1.

4. The method of managing unmanned aerial vehicle patrols as recited in claim 3, wherein the set of abstract coordinates $(x_\beta, y_\beta)$ for each of the seed points is scaled to a set of geographic coordinates $(x_{geo}, y_{geo})$ on the three-dimensional occupancy map as $x_{geo}=x_\beta \times W$ and $y_{geo}=y_\beta \times L$, where W is a width of the three-dimensional occupancy map and L is a length of the three-dimensional occupancy map.

5. The method of managing unmanned aerial vehicle patrols as recited in claim 1, wherein the risk factor, R, for each of the clusters is given by $$R = \frac{S}{U+1},$$

where S is a sum of the priority scores of the critical and strategic waypoints within the respective cluster, and U is a total number of the UAVs assigned to the respective cluster.

6. The method of managing unmanned aerial vehicle patrols as recited in claim 1, wherein the weighted score, $S_w$, is given by $S_w=(W_I \times I)+(W_D \times D)+(W_P \times P)$, where I is an idleness time, D is a distance between a corresponding one of the UAVs and the corresponding one of the critical and strategic waypoints, and P is the priority score of the corresponding one of the critical and strategic waypoints, wherein $W_I$ is a weight for the idleness, $W_D$ is a weight for the distance, and $W_P$ is a weight for the priority score.

7. The method of managing unmanned aerial vehicle patrols as recited in claim 1, further comprising the follower UAVs each generating decoy waypoints at regular intervals, wherein each of the decoy waypoints has randomly selected coordinates within the corresponding cluster of the corresponding one of the follower UAVs.

8. The method of managing unmanned aerial vehicle patrols as recited in claim 1, further comprising at least one of the leader and follower UAVs transitioning to a chaser UAV, wherein, upon detection of a potential threat, the chaser UAV continuously monitors the potential threat.

9. A method of managing unmanned aerial vehicle patrols, comprising:
    establishing a three-dimensional occupancy map defining a region of interest;
    establishing a set of critical waypoints within the region of interest, wherein each of the critical waypoints has a set of coordinates on the three-dimensional occupancy map associated therewith;
    generating a set of seed points using a beta probability distribution;
    applying Voronoi tessellation to produce a set of strategic waypoints within the region of interest by using the set of seed points as an input, wherein each of the strategic waypoints has a set of coordinates on the three-dimensional occupancy map associated therewith, and wherein the set of coordinates associated with each of the strategic waypoints is a centroid of a corresponding Voronoi cell produced by the Voronoi tessellation;

assigning a priority score to each of the critical waypoints and each of the strategic waypoints;

dividing a plurality of unmanned aerial vehicles (UAVs) into a set of leader UAVs and a set of follower UAVs;

clustering the critical and strategic waypoints by applying k-mean clustering based on a total number of leader UAVs into clusters;

assigning a risk factor, R, to each of the clusters, wherein the risk factor, R, for each of the clusters is given by $$R = \frac{S}{u+1},$$

where S is a sum of the priority scores of the critical and strategic waypoints within the respective cluster, and U is a total number of the UAVs assigned to the respective cluster;

assigning the UAVs to the clusters based on the respective risk factors of the clusters; and each of the UAVs visiting the critical and strategic waypoints within the cluster assigned thereto, wherein a choice of a particular one of the critical and strategic waypoints to be visited is based on a weighted score.

10. A method of managing unmanned aerial vehicle patrols, comprising:

establishing a three-dimensional occupancy map defining a region of interest;

establishing a set of critical waypoints within the region of interest, wherein each of the critical waypoints has a set of coordinates on the three-dimensional occupancy map associated therewith;

generating a set of seed points using a beta probability distribution;

applying Voronoi tessellation to produce a set of strategic waypoints within the region of interest by using the set of seed points as an input, wherein each of the strategic waypoints has a set of coordinates on the three-dimensional occupancy map associated therewith, and wherein the set of coordinates associated with each of the strategic waypoints is a centroid of a corresponding Voronoi cell produced by the Voronoi tessellation;

assigning a priority score to each of the critical waypoints and each of the strategic waypoints;

dividing a plurality of unmanned aerial vehicles (UAVs) into a set of leader UAVs and a set of follower UAVs;

clustering the critical and strategic waypoints by applying k-mean clustering based on a total number of leader UAVs into clusters;

assigning a risk factor to each of the clusters;

assigning the UAVs to the clusters based on the respective risk factors of the clusters; and each of the UAVs visiting the critical and strategic waypoints within the cluster assigned thereto, wherein a choice of a particular one of the critical and strategic waypoints to be visited is based on a weighted score, Sw, wherein the weighted score, Sw, is given by $Sw=(W_I \times I)+(Wd \times D)+(Wp \times P)$, where I is an idleness time, D is a distance between a corresponding one of the UAVs and the corresponding one of the critical and strategic waypoints, and P is the priority score of the corresponding one of the critical and strategic waypoints, wherein $W_I$ is a weight for the idleness, Wv is a weight for the distance, and Wp is a weight for the priority score.

* * * * *